US008244303B2

(12) United States Patent
Cho et al.

(10) Patent No.: US 8,244,303 B2
(45) Date of Patent: Aug. 14, 2012

(54) APPARATUS AND METHOD FOR TRANSMITTING A PLURALITY OF KEY DATA

(75) Inventors: Jeong-Sik Cho, Suwon-si (KR); Young-Jip Kim, Suwon-si (KR); Joon-Ho Park, Suwon-si (KR); Byoung-Dai Lee, Suwon-si (KR); Tae-Soo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 525 days.

(21) Appl. No.: 12/456,837

(22) Filed: Jun. 23, 2009

(65) Prior Publication Data

US 2009/0316911 A1 Dec. 24, 2009

(30) Foreign Application Priority Data

Jun. 24, 2008 (KR) .................. 10-2008-0059743

(51) Int. Cl.
*H04B 1/38* (2006.01)
*H04L 9/08* (2006.01)
(52) U.S. Cl. ....................... 455/559; 380/284
(58) Field of Classification Search .......... 455/559; 380/284

See application file for complete search history.

(56) References Cited

U.S. PATENT DOCUMENTS

2007/0259647 A1  11/2007 Lee et al.
2010/0027787 A1* 2/2010 Benkert et al. ............. 380/45

FOREIGN PATENT DOCUMENTS

| KR | 10-2007-0089027 | 8/2007 |
| KR | 10-2007-0096530 | 10/2007 |
| KR | 10-2007-0096531 | 10/2007 |
| KR | 10-2008-0021185 | 3/2008 |

OTHER PUBLICATIONS

Notification of Transmittal of the International Search Report and the Written Opinion of the international Searching Authority, or the Declaration dated Feb. 9, 2010 in connection with International Patent Application No. PCT/KR2009/003361.

* cited by examiner

*Primary Examiner* — Joseph Chang

(57) ABSTRACT

An apparatus and method for transmitting a plurality of key data. When a Short-Term Key Message (STKM) is received, a mobile equipment transmits the received STKM to a smart card. The smart card determines whether there are a plurality of key data in the STKM, detects the plurality of key data when there are the plurality of key data, generates individual information for identifying each of the plurality of detected key data, generates a response message having the plurality of detected key data and the generated individual information, and transmits the response message to the mobile equipment. Therefore, a plurality of key data can be included and transmitted in one message.

20 Claims, 5 Drawing Sheets

| | |
|---|---|
| MBMS Operation response Data Object Tag (0x&3) | 1 byte |
| MBMS Operation response Data Object Length (L) | 1~4 bytes |
| OMA BCAST Operation response Data Object Tag (0xAE) | 1 byte |
| OMA BCAST Operation response Data Object Length (L1) | 1~4 bytes |
| BCAST management_data response Data Object Tag (0xAE) | 1 byte |
| BCAST management_data response Data Object Length (l) | 1 byte |
| BCAST management_data response Data Object | 1 byte |
| Data Object | P bytes |

FIG.1A

| | |
|---|---|
| Object Tag : 0x86   TEK Data Object Tag | 1 byte |
| TEK Data Object Length (D) | 1 byte |
| TEK Data Object | D bytes |
| Object Tag : 0x87    SALT Data Object Tag | 1 byte |
| SALT Data Object Length (E) | 1 byte |
| SALT Data Object | E bytes |

FIG.1B

| | |
|---|---|
| Object Tag : 0x86   Data Object Tag | 1 byte |
| Data Object Length (D) | 1 byte |
| Number of Key Data Object (N) | 1 byte |
| KEY Data Object (E_1) | E_1 bytes |
| KEY Data Object (E_2) | E_2 bytes |
| ⋮ | |
| KEY Data Object (E_N) | E_N bytes |

FIG.4A

| | |
|---|---|
| KEY Data Object Tag (0x87) | 1 byte |
| KEY Data Object Length (E) | 1 byte |
| TEK Data Type | 1 byte |
| TEK ID | 2 bytes |
| TEK Length (F) | 1 byte |
| TEK Data | F bytes |
| SALT Length (G) (Option) | 1 byte |
| SALT Data (Option) | G bytes |

FIG.4B

APPARATUS AND METHOD FOR TRANSMITTING A PLURALITY OF KEY DATA

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Jun. 24, 2008 and assigned Serial No. 10-2008-0059743, the disclosures of which are incorporated herein by reference.

TECHNICAL FIELD OF THE INVENTION

The present invention relates generally to an apparatus and method for transmitting a plurality of key data, and in particular, to an apparatus and method for transmitting a plurality of key data through one Multimedia Internet Keying (MIKEY) message.

BACKGROUND OF THE INVENTION

The Open Mobile Alliance (OMA) is an organization that works on standardization of inter-operability between individual mobile solutions. The OMA has specified two profiles in a broadcasting protocol proper for use in a broadcasting environment. One is a Digital Rights Management (DRM) profile and the other is a smart card profile. In the smart card profile, a video/audio stream encrypted by a specific key is transmitted to a mobile equipment through a broadcasting network. Also, a data stream including a key required for decrypting the encrypted video/audio stream is transmitted to a mobile equipment through the same broadcasting network, and is a Short-Term Key Message (STKM).

In the smart card profile, an encrypted Traffic Encryption Key (TEK) included in the STKM is not decrypted in the mobile equipment, but a received TEK is transmitted to a universal subscriber identity module (USIM), that is, a smart card. In the future, the TEK will be used to actually decrypt an encrypted service and content.

In the smart profile, a TEK to be used in the next period needs to be acquired in advance in order to secure stability from factors interfering with TEK acquisition such as a communication network trouble and a message processing delay. Accordingly, in the smart profile, a plurality of TEKs are inserted into an encrypted data field of a KEMAC (key data transport payload) in one MIKEY structure and are transmitted to the USIM.

When an STKM of the MIKEY structure including the plurality of TEKs is received, the USIM analyzes and decrypts the received STKM, generates a response message as illustrated in FIG. 1A, and transmits the generated message to the mobile equipment.

FIGS. 1A and 1B illustrate a structure of a response message according to STKM reception in a USIM, in which FIG. 1A illustrates a schematic structure of the response message and FIG. 1B illustrates a detailed structure of a data object field of the response message.

Referring to FIG. 1A, the data object field of the response message generated in the USIM has the structure as illustrated in FIG. 1B. The USIM inserts a plurality of TEK data decrypted in the data object field into the response message, and transmits the response message to the mobile equipment.

Conventionally, the mobile equipment inserts a plurality of key data into one MIKEY message and transmits the message to the USIM. However, there are the following problems when the USIM transmits a response message for MIKEY reception to the mobile equipment.

First, when the plurality of key data are included and transmitted in a key data sub-payload field of the MIKEY message, a TEK and a SALT key are transmitted together. The SALT key is included optionally. If needed, only the TEK may be included and transmitted. When the TEK and the SALT key are transmitted together or only the TEK data is transmitted, the USIM may not determine which of multiple TEKs corresponds to the SALT key.

In a response message for the STKM that the USIM has received from the mobile equipment, there is no structure having information about the number of key data inserted by the mobile equipment into the STKM or information for mapping a plurality of TEKs to TEK IDs.

Accordingly, there is a problem in that a TEK for decrypting video/audio data corresponding to the next period in a current stream may not be identified since it is impossible to identify a specific TEK as well as the number of TEKs inserted into the STKM when the mobile equipment receives a corresponding response message. There is another problem in that it is difficult to identify a TEK corresponding to a SALT key transmitted along with the TEK.

SUMMARY OF THE INVENTION

To address the above-discussed deficiencies of the prior art, it is a primary object to provide an apparatus and method for transmitting a plurality of key data.

According to an aspect of the present invention, there is provided an apparatus for transmitting a plurality of key data, including: a mobile equipment for transmitting a received STKM to a smart card when the STKM is received; and the smart card for determining whether there are a plurality of key data in the STKM, detecting the plurality of key data when there are the plurality of key data, generating individual information for identifying each of the plurality of detected key data, generating a response message having the plurality of detected key data and the generated individual information, and transmitting the response message to the mobile equipment.

According to an aspect of the present invention, there is provided a method for transmitting a plurality of key data between a mobile equipment and a smart card, including: transmitting, by the mobile equipment, a received STKM to the smart card when the STKM is received; determining, by the smart card, whether there are a plurality of key data in the STKM; detecting, by the smart card, the plurality of key data when there are the plurality of key data; generating, by the smart card, individual information for identifying each of the plurality of detected key data; and generating, by the smart card, a response message having the plurality of detected key data and the generated individual information and transmitting the response message to the mobile equipment.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 1A and 1B illustrate a structure of a response message according to STKM reception in a conventional smart card;

FIGS. 4A and 4B illustrate a structure of a response message according to STKM reception according to an exemplary embodiment of the present invention.

Throughout the drawings, the same drawing reference numerals will be understood to refer to the same elements, features and structures.

DETAILED DESCRIPTION OF THE INVENTION

FIGS. 2 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

Hereinafter, a structure and operation of a key data transmitter and receiver according to an exemplary embodiment of the present invention will be described in detail with reference to FIG. 2. An example of a key data transmission/reception process between a Mobile Equipment (ME) and a USIM according to an exemplary embodiment of the present invention will be described.

Figure 2:
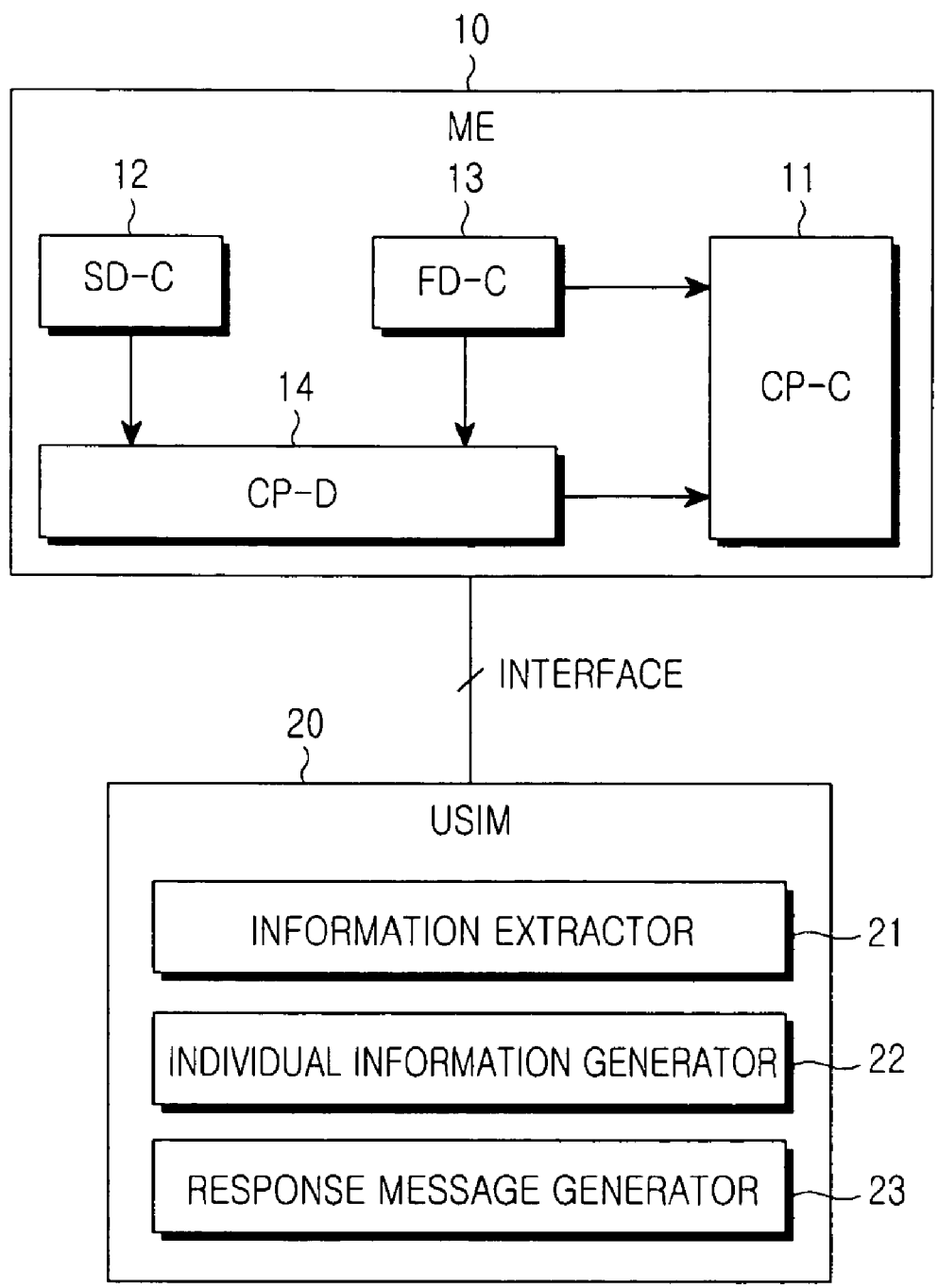
FIG. 2 illustrates a structure diagram of a key data transmitter and receiver according to an exemplary embodiment of the present invention.

FIG. 2 is a structure diagram of a key data transmitter and receiver according to an exemplary embodiment of the present invention.

First, the key data transmitter and receiver according to the exemplary embodiment of the present invention include an ME 10 and a USIM 20.

The ME 10 includes a content provider-client (CP-C) component 11, a stream distribution-client (SD-C) component 12, a file distribution-client (FD-C) component 13, and a content provider-decryption (CP-D) component 14.

The SD-C component 12 acts as a receiver for receiving broadcast encrypted stream content, which outputs the received content to the CP-D component 14 so that the CP-D component 14 can decrypt the content. The FD-C component 13 operates as a receiver that outputs broadcast encrypted file content to the CP-D component 14 so that the CP-D component 14 can decrypt the content. The CP-C component 11 plays a role in acquiring an encryption key required to decrypt encrypted content by performing registration and subscription and transmitting the acquired key to the CP-D component 14.

In the ME 10 having the above-described structure, a service can be used when the CP-D component 14 decrypts content encrypted by the encryption key through the SD-C component 12 in the case of the stream content or through the FD-C component 13 in the case of the file content.

According to an exemplary embodiment of the present invention, when an STKM including a plurality of key data required for decrypting and reproducing broadcast service data is output to the FD-C component 13 of the ME 10, the FD-C component 13 inserts the output STKM into an application protocol data unit (APDU) command field and outputs it to the USIM 20 through an interface. In a smart profile, as described above, key data to be used in the next period needs to be acquired in advance in order to secure stability from factors interfering with key data acquisition such as a communication network trouble and a message processing delay in the ME. Accordingly, the ME 10 inserts a plurality of key data into one STKM and transmits the STKM to the USIM 20.

Figures 3A, 3B, 3C, 3D:
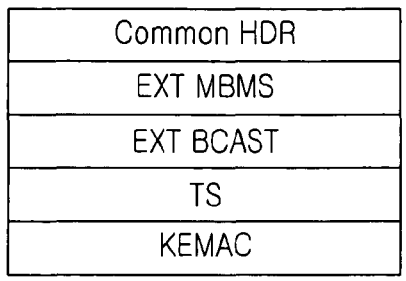
FIGS. 3A to 3D illustrate a structure of an STKM including a plurality of key data.

The STKM transmitted to the USIM 20 is configured as illustrated in FIG. 3A. The STKM structure will be described with reference to FIGS. 3A to 3D.

FIGS. 3A to 3D illustrate a structure of an STKM including a plurality of key data implemented on the basis of a MIKEY standard.

Referring to FIG. 3A, encrypted key data, that is, a TEK, exists in a KEMAC payload in the STKM structure. A structure of the KEMAC payload is made as illustrated in FIG. 3B. In the KEMAC payload structure, encrypted data exists in an encrypted data field. When the encrypted data field is decrypted, a plurality of key data sub-payloads having the structure as illustrated in FIG. 3C are generated. In this case, the plurality of key data sub-payloads are as illustrated in FIG. 3D. Here, the next payload of '20' indicates that the next key data sub-payload exists and the next payload of '0' indicates that the next key data sub-payload does not exist. An encrypted TEK exists in each key data field in the structure of the plurality of key data sub-payloads.

When the ME 10 transmits the above-described STKM to the USIM 20 through the interface, the USIM 20 decrypts a plurality of key data extracted using a Service Encryption Key (SEK) after extracting a plurality of encrypted key data. Then, the USIM 20 transmits the plurality of decrypted key data and individual information of the key data to the ME 10. Through this process, the smart profile can secure security by storing a SEK/Program Encryption Key (PEK) to be used at the time of encrypting the TEK in a source field within the smart card profile without leaking the SEK/PEK to the ME.

Now, a structure of the USIM 20 according to STKM transmission of the ME 10 will be described in detail.

The USIM 20 is inserted into the ME 10 through the interface and includes an information extractor 21, an individual information generator 22, and a response message generator 23.

When an STKM including a plurality of key data is received from the ME 10 through the interface, the information extractor 21 extracts each of the plurality of key data encrypted in an encrypted data field of the received STKM. The information extractor 21 acquires a plurality of key data required for decrypting and reproducing encrypted broadcast service data by decrypting the plurality of key data extracted using the SEK. In this case, the plurality of key data can be composed of only TEKs or by TEKs and SALT keys.

The individual information generator 22 generates individual information for the acquired key data. The individual information includes identification information of an acquired TEK, a TEK length, existence information of a SALT key, and a SALT key length.

The response message generator 23 generates a response message (APDU response data) having the structure as illustrated in FIG. 4A including the plurality of acquired key data and the generated individual information, and transmits the response message to the ME 10 through the interface. This will be described in detail with reference to FIGS. 4A and 4B.

FIGS. 4A and 4B illustrate a structure of a response message according to STKM reception according to an exemplary embodiment of the present invention.

Referring to FIG. 4A, the response message includes an Object Tag field, a Data Object Length field, a Number of Key Data Object field, and Key Data Object [E_1], Key Data Object [E_2], - - - , Key Data Object [E_N] fields.

The Object Tag field has a 1-byte length and indicates the response message transmitted after MTK generation among functions of the USIM 20.

A Data Object Length field has a 1-byte length and indicates the total length (D bytes) of data objects. The total length of data objects includes all lengths of a plurality of key data fields, that is, the Key Data Object [E_1], Key Data Object [E_2], - - - , Key Data Object [E_N] fields. In this case, the total length D of data objects is computed by the following Equation 1:

$$D=1(\text{Data Object Length})+1(\text{Number of Key Data object})+E\_1+E\_2+\text{---}+E\_N[\text{bytes}] \quad [\text{Eqn. 1}]$$

The Number of Key Data Object field has a 1-byte length and indicates the total number of key data objects in the data object field.

Each of the Key Data Objects [E_1], [E_2], - - - , [E_N] has an I-byte length (where I is an arbitrary value), and includes a SALT key or a TEK corresponding to a corresponding TEK ID. The Key Data Object field has the structure as illustrated in FIG. 4B.

Referring to FIG. 4B, the Key Data Object field includes a Key Data Object Tag field, a Key Data Object Length field, a Key Data Type field, a TEK ID field, a TEK Length field, a TEK Data field, a SALT Length field, and a SALT Data field.

Specifically, the Key Data Object Tag field has a 1-byte length and indicates that a key data object starts and the data object includes the TEK and the SALT key.

The Key Data Object Length field has a 1-byte length and indicates the total length E of key data objects. The total length E of key data objects is computed by the following Equation 2:

$$E=1(\text{Key Data Type})+2(\text{TEK ID})+1(\text{TEK Length})+F(\text{TEK Data})+\{1(\text{SALT length})+G(\text{SALT Data})\} \quad [\text{Eqn. 2}]$$

Here, {1 (SALT length)+G (SALT Data)} can be excluded when the SALT key is not included according to a key type.

The Key Data Type field has a 1-byte length and indicates that only a TEK is included when a corresponding field value is '0' and that a TEK and a SALT key are included together when the field value is '1'. Accordingly, the ME 10 can determine whether the SALT key exists.

The TEK ID field has a 2-byte length and indicates a TEK ID for identifying the TEK. In this case, the TEK ID is the same as that transmitted in a MIKEY Extension Multimedia Broadcast/Multicast Service (EXT MBMS).

The TEK Length field has a 1-byte length and indicates a TEK length.

The TEK Data field has an F-byte length (where F is an arbitrary value) and includes a TEK.

The SALT Length field and the SALT Data field can be generated only when the TEK and the SALT key are included together in the STKM. The SALT Length field has a 1-byte length and indicates a SALT key length. The SALT Data field has a G-byte length (where G is an arbitrary value) and includes a SALT key.

The USIM 20 generating the response message created in the above-described structure transmits the generated response message to the ME 10. Upon receipt of the above-described response message, the ME 10 can determine communication availability with the USIM 20 and the number of key data included in the STKM. The ME 10 can pre-read a TEK or SALT key value required in the next video/audio stream reproduction period through individual information for a plurality of key data. The ME 10 can individually identify each of the plurality of key data including only the TEK or both the TEK and the SALT key. Accordingly, the ME 10 can smoothly reproduce the next video/audio stream to be transmitted after a current video/audio stream whose reproduction is in progress using the pre-read PEK or SALT key value.

Now, a process for transmitting a plurality of key data between the ME 10 and the USIM 20 configured as illustrated in FIGS. 4A and 4B according to an exemplary embodiment of the present invention will be described with reference to FIG. 5.

Figure 5:
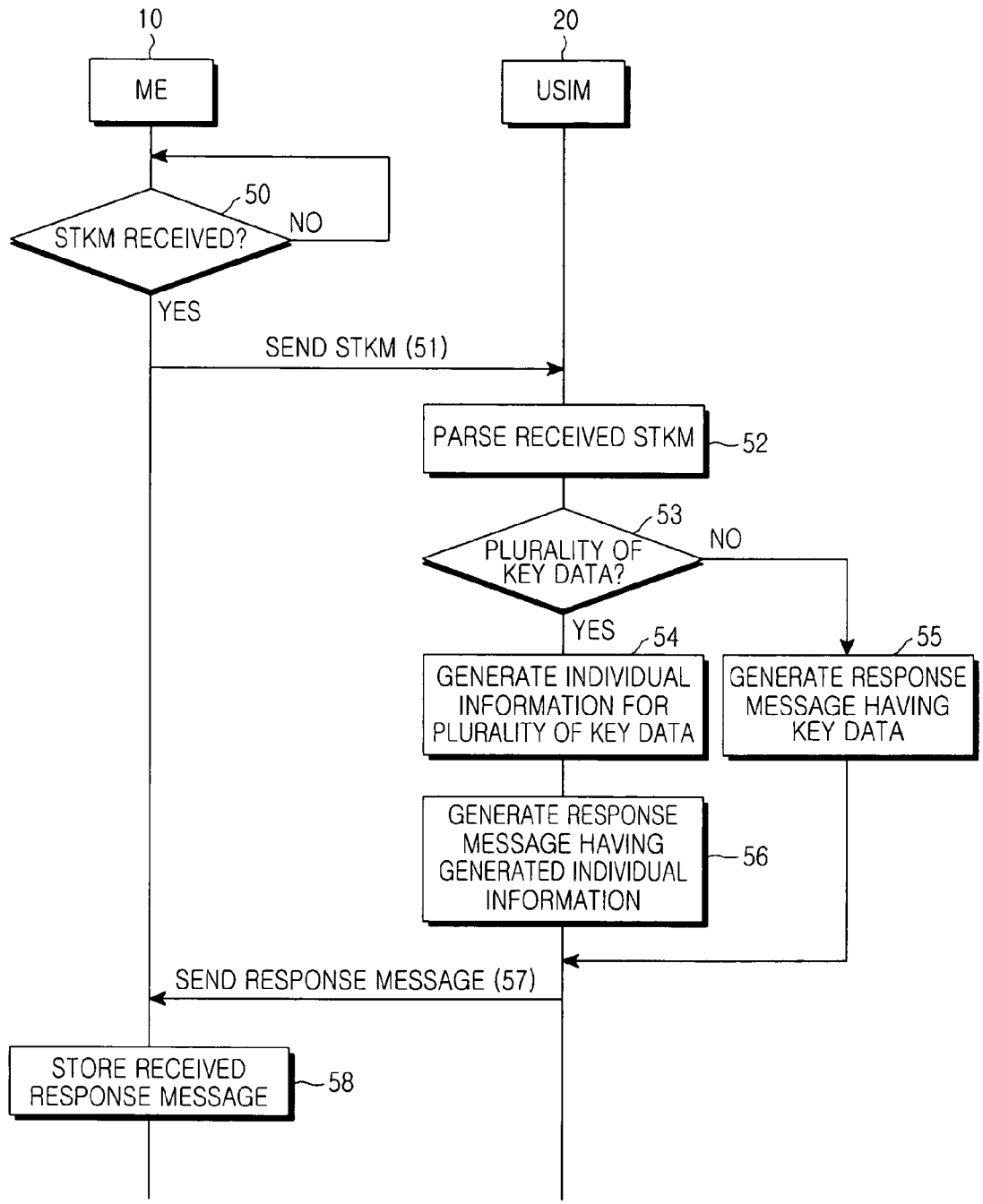
FIG. 5 is a flowchart illustrating a process for transmitting a plurality of key data between a mobile equipment and a smart card according to an exemplary embodiment of the present invention.

FIG. 5 is a flowchart illustrating a process for transmitting a plurality of key data between an ME and a smart card according to an exemplary embodiment of the present invention.

In step 50, the ME 10 determines whether an STKM including a plurality of key data required for decrypting and reproducing broadcast service data is received. When the STKM is received, the ME 10 proceeds to step 51. Otherwise, in step 50, the ME 10 continuously determines whether the STKM is received.

In step 51, the ME 10 transmits the received STKM to the USIM 20.

The USIM 20 parses the received STKM in step 52 and determines whether a plurality of key data exists in the parsed STKM in step 53. When the plurality of key data exists as the determination result, the USIM 20 proceeds to step 54. Otherwise, the USIM 20 proceeds to step 55 to analyze and decrypt the key data included in the received STKM and generates a response message including the decrypted key data.

The USIM 20 proceeding from step 53 to step 54 analyzes and decrypts the plurality of key data included in the received STKM and generates individual information for the plurality of key data decrypted. In this case, the individual information for the plurality of key data includes at least one of identification information of a decrypted TEK, a TEK length, existence information of a SALT key, and a SALT key length as described above.

In step 56, the USIM 20 generates a response message including the plurality of key data having the decrypted TEK or SALT key and the generated individual information.

In step 57, the USIM 20 transmits the generated response message to the ME 10 through the interface.

In step 58, the ME 10 stores the received response message and parses the plurality of key data having the decrypted TEK or SALT key and the generated individual information included in the stored response message although not illustrated in FIG. 5. Then, the ME 10 checks key data for decrypting a video/audio stream to be reproduced in the next period among the plurality of decrypted key data. When the next period is reached, the ME 10 decrypts and reproduces a transmitted video/audio stream using the checked key data. Accordingly, a user can receive a smooth video/audio stream reproduction service.

According to an exemplary embodiment of the present invention, individual information for identifying a type of TEK data for each key data of an STKM including a plurality of key data transmitted from an ME is transmitted and key data corresponding to the next period of video/audio data of a current stream is pre-checked by identifying each of the plurality of key data, so that a key data reception delay due to a processing speed delay of a communication network and an ME can be prevented.

Accordingly, the ME can provide the user with a smooth video/audio stream service by smoothly decrypting an encrypted video/audio stream.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A smart card configured to transmit a plurality of key data, comprising:
   an information extractor configured to extract each of a plurality of key data when a Short-Term Key Message (STKM) including the plurality of key data is received from a mobile equipment, acquire a plurality of key data required for decrypting and reproducing encrypted broadcast service data by decrypting the plurality of the extracted key data;
   an individual information generator configured to generate individual information for identifying each of the plurality of acquired key data; and
   a response message generator configured to generate a response message having the plurality of acquired key data and the generated individual information, and transmit the response message to the mobile equipment.

2. The smart card of claim 1, wherein the plurality of key data include at least one of a Traffic Encryption Key (TEK) and a SALT key.

3. The smart card of claim 2, wherein the individual information includes at least one of TEK identification information, a TEK length, existence information of the TEK, and a SALT key length.

4. The smart card of claim 1, wherein the response message includes:
   a field indicating a response message transmitted after a Multimedia Broadcast/Multicast Service (MBMS) Traffic Key (MTK) is generated;
   a field indicating a total length of at least one data object;
   a field indicating the total number of key data objects within a key data object field; and
   the key data object field having at least one of a SALT key and a TEK corresponding to TEK identification information.

5. The smart card of claim 4, wherein the key data object field includes:
   a field indicating that the key data object field starts and a data object includes the TEK and the SALT key;
   a field indicating a total length of at least one key data object;
   a field indicating whether the SALT key exits;
   a field indicating TEK identification information for identifying the TEK;
   a field indicating a TEK length; and
   a field having the TEK.

6. The smart card of claim 5, wherein the key data object field further includes:
   a field indicating a SALT key length when the SALT key is included in the key data; and
   a field having the SALT key.

7. The apparatus of claim 1, wherein the mobile terminal comprises an interface configured to couple to the smart card and wherein the smart card is configured to be inserted into the interface.

8. A method for transmitting a plurality of key data in a smart card, comprising:
   receiving, from a mobile equipment, a Short-Term Key Message (STKM) including the plurality of key data;
   extracting each of a plurality of key data and acquiring a plurality of key data required for decrypting and reproducing encrypted broadcast service data by decrypting the plurality of the extracted key data;
   generating individual information for identifying each of the plurality of acquired key data; and
   generating a response message having the plurality of acquired key data and the generated individual information and transmitting the response message to the mobile equipment.

9. The method of claim 8, wherein the plurality of acquired key data include at least one of a TEK and a SALT key.

10. The method of claim 9, wherein the individual information includes at least one of TEK identification information, a TEK length, existence information of the TEK, and a SALT key length.

11. The method of claim 8, wherein the response message includes:
    a field indicating a response message transmitted after an MTK is generated;
    a field indicating a total length of at least one data object;
    a field indicating the total number of key data objects within a key data object field; and
    the key data object field having at least one of a SALT key and a TEK corresponding to TEK identification information.

12. The method of claim 11, wherein the key data object field includes:
    a field indicating that the key data object field starts and a data object includes the TEK and the SALT key;
    a field indicating a total length of at least one key data object;
    a field indicating whether the SALT key exits;
    a field indicating TEK identification information for identifying the TEK;
    a field indicating a TEK length; and
    a field having the TEK.

13. The method of claim 12, wherein the key data object field further includes:
    a field indicating a SALT key length when the SALT key is included in the key data; and
    a field having the SALT key.

14. A mobile equipment capable of transmitting a plurality of key data, comprising:
    an interface configured to couple to a smart card,
    a first component configured to transmit a received Short-Term Key Message (STKM) to the smart card when the STKM is received; and
    the smart card configured to determine whether a plurality of key data exists in the STKM, detect the plurality of key data when the plurality of key data exists, generate individual information for identifying each of the plurality of detected key data, generate a response message having the plurality of detected key data and the generated individual information, and transmit the response message to the mobile equipment.

15. The mobile terminal of claim 14, wherein the plurality of key data include at least one of a Traffic Encryption Key (TEK) and a SALT key.

16. The mobile terminal of claim 15, wherein the individual information includes at least one of TEK identification information, a TEK length, existence information of the TEK, and a SALT key length.

17. The mobile terminal of claim 14, wherein the response message includes:
- a field indicating a response message transmitted after a Multimedia Broadcast/Multicast Service (MBMS) Traffic Key (MTK) is generated;
- a field indicating a total length of at least one data object;
- a field indicating the total number of key data objects within a key data object field; and
- the key data object field having at least one of a SALT key and a TEK corresponding to TEK identification information.

18. The mobile terminal of claim 17, wherein the key data object field includes:
- a field indicating that the key data object field starts and a data object includes the TEK and the SALT key;
- a field indicating a total length of at least one key data object;
- a field indicating whether the SALT key exits;
- a field indicating TEK identification information for identifying the TEK;
- a field indicating a TEK length; and
- a field having the TEK.

19. The mobile terminal of claim 18, wherein the key data object field further includes:
- a field indicating a SALT key length when the SALT key is included in the key data; and
- a field having the SALT key.

20. The mobile terminal of claim 14, wherein the smart card is configured to be inserted into the interface.

* * * * *